United States Patent [19]

Clements

[11] Patent Number: 4,526,638
[45] Date of Patent: Jul. 2, 1985

[54] APPARATUS AND METHOD FOR JOINING WEBS

[75] Inventor: Trevor F. Clements, Oldham, England

[73] Assignee: Hurley Moate Engineering Company Limited, Oldham, England

[21] Appl. No.: 513,910

[22] Filed: Jul. 14, 1983

[30] Foreign Application Priority Data

Jul. 17, 1982 [GB] United Kingdom ............... 8220797
Feb. 28, 1983 [GB] United Kingdom ............... 8305521

[51] Int. Cl.³ .............................................. B31F 5/00
[52] U.S. Cl. ................... 156/159; 156/304.3; 156/353; 156/502; 156/505; 156/506; 242/56 R; 242/58.1
[58] Field of Search ............... 156/159, 267, 304.3, 156/304.4, 353, 502, 505, 506; 242/56 R, 58.1, 58.3

[56] References Cited

U.S. PATENT DOCUMENTS 1,217,253  2/1917  Williamson ................. 156/159
3,024,157  3/1962  Beerli ....................... 242/58.1
3,615,994  10/1971 Maclaine et al. ............ 156/159

FOREIGN PATENT DOCUMENTS 0914150  12/1962  United Kingdom .
1140401  1/1969   United Kingdom .
1199922  7/1970   United Kingdom .
1370461  10/1974  United Kingdom .
1519326  7/1978   United Kingdom .
1519524  8/1978   United Kingdom .

Primary Examiner—Jay H. Woo
Assistant Examiner—Timothy W. Heitbrink
Attorney, Agent, or Firm—William R. Hinds

[57] ABSTRACT

A method of joining two flexible webs comprises bringing the webs into overlapping relationship, cutting the overlapped webs, removing a part of one or both webs from the region of the cut, and applying a length of adhesive material to marginal portions of the webs adjacent the cut.

The webs may be held stationary while being joined. The cutting and joining are preferably effected simultaneously. The webs may be brought into register before cutting and joining. Adhesive material may be applied to both sides of the webs. Joining may be initiated manually or automatically in response to the speed or diameter of an expiring reel.

17 Claims, 19 Drawing Figures

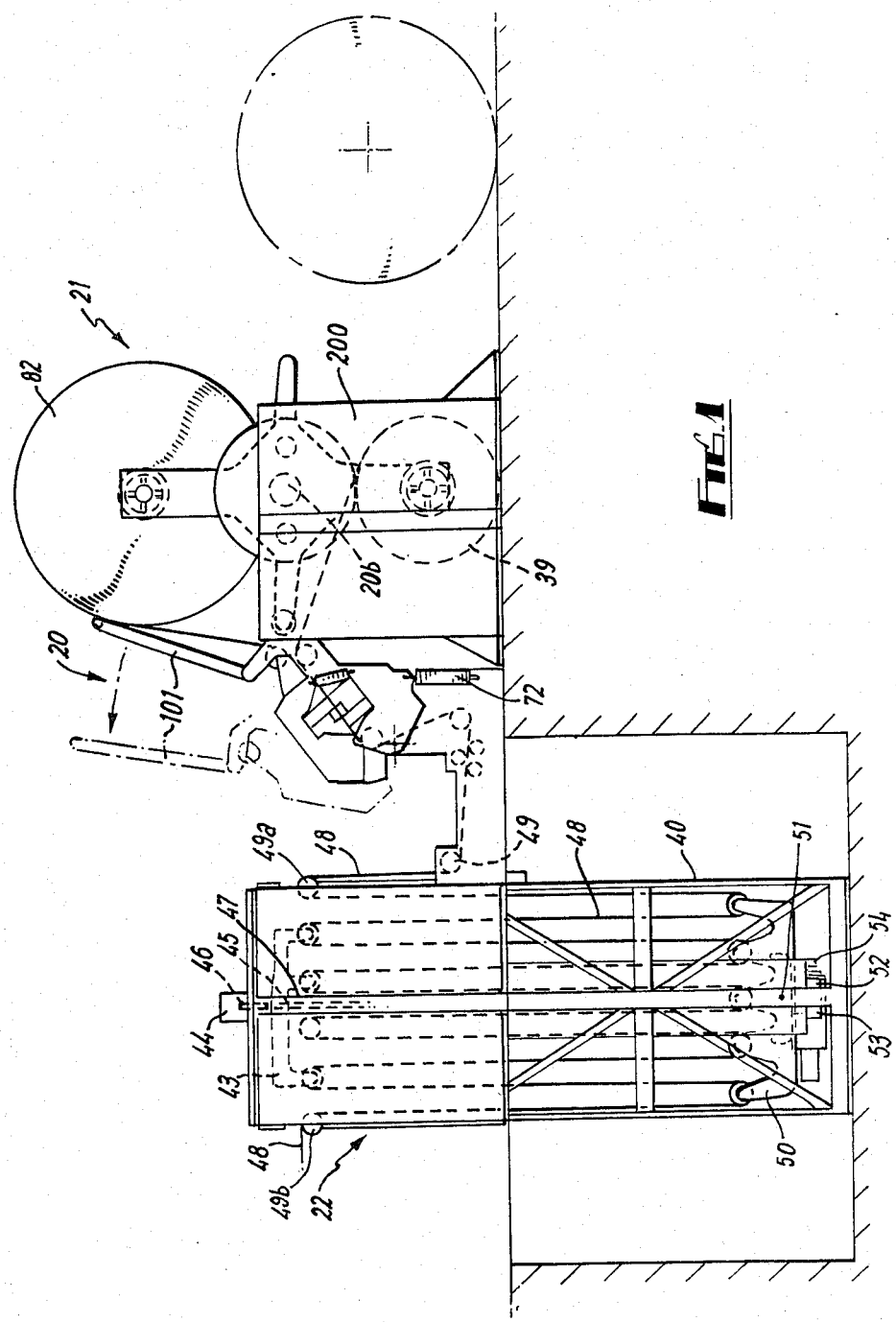

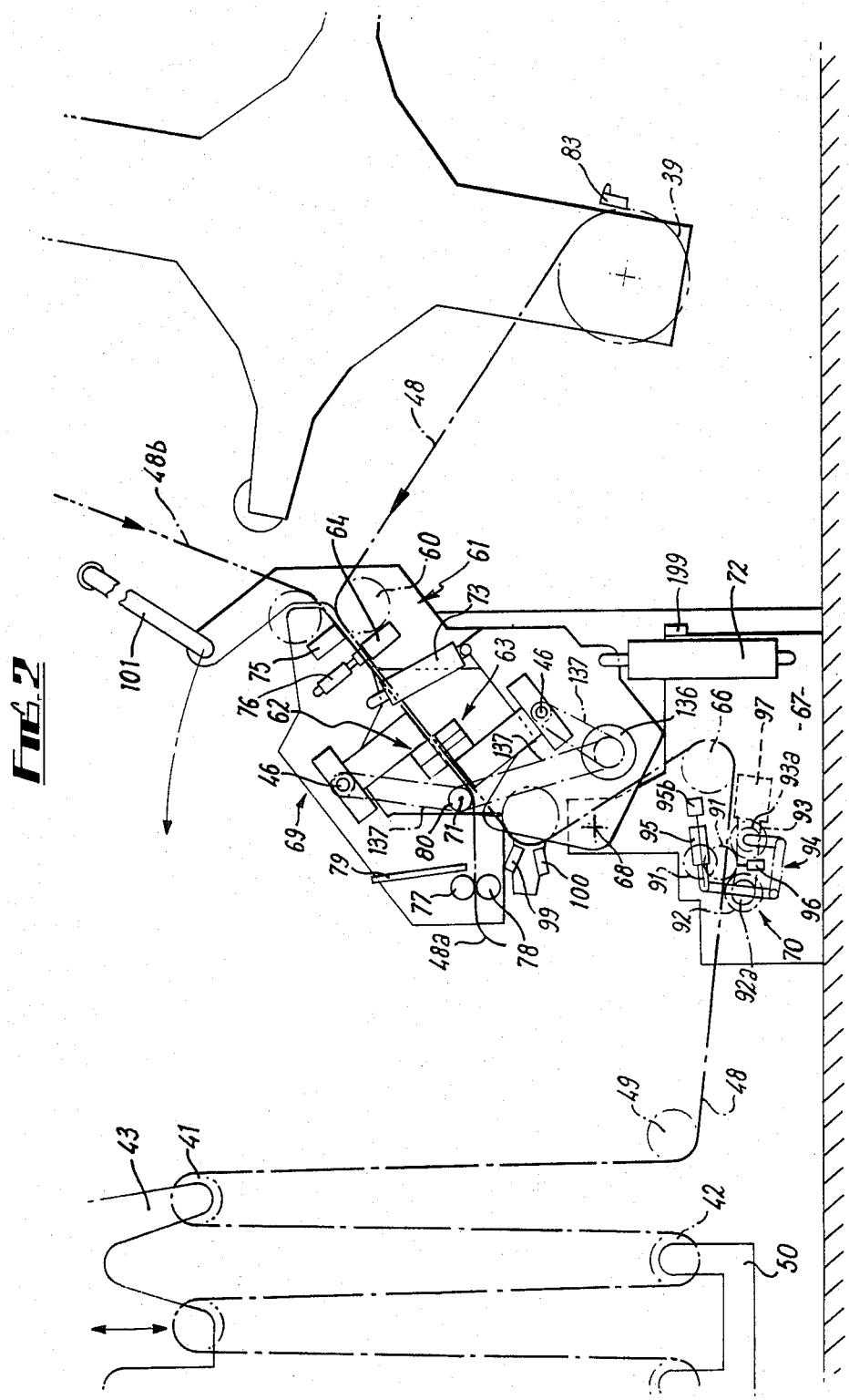

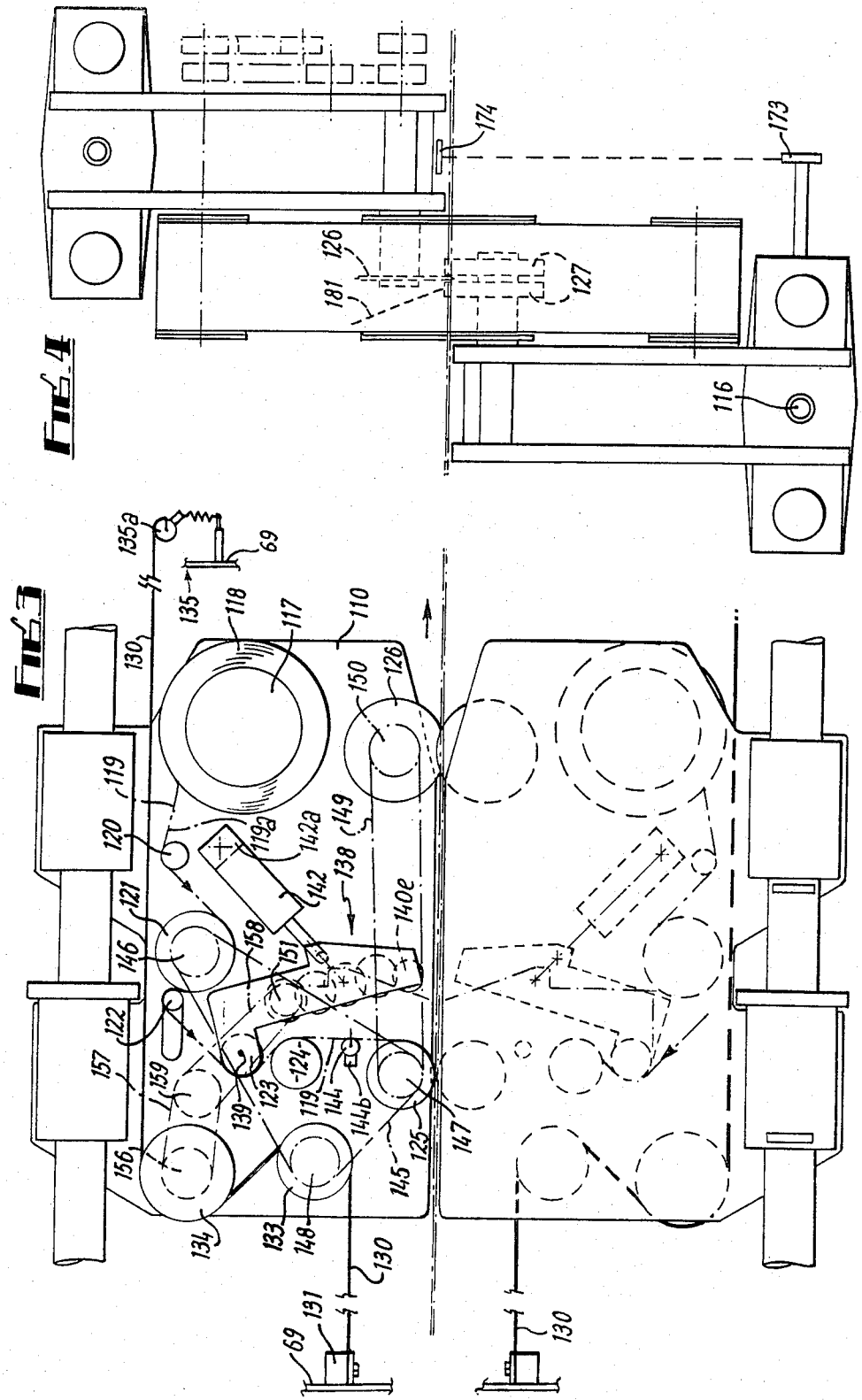

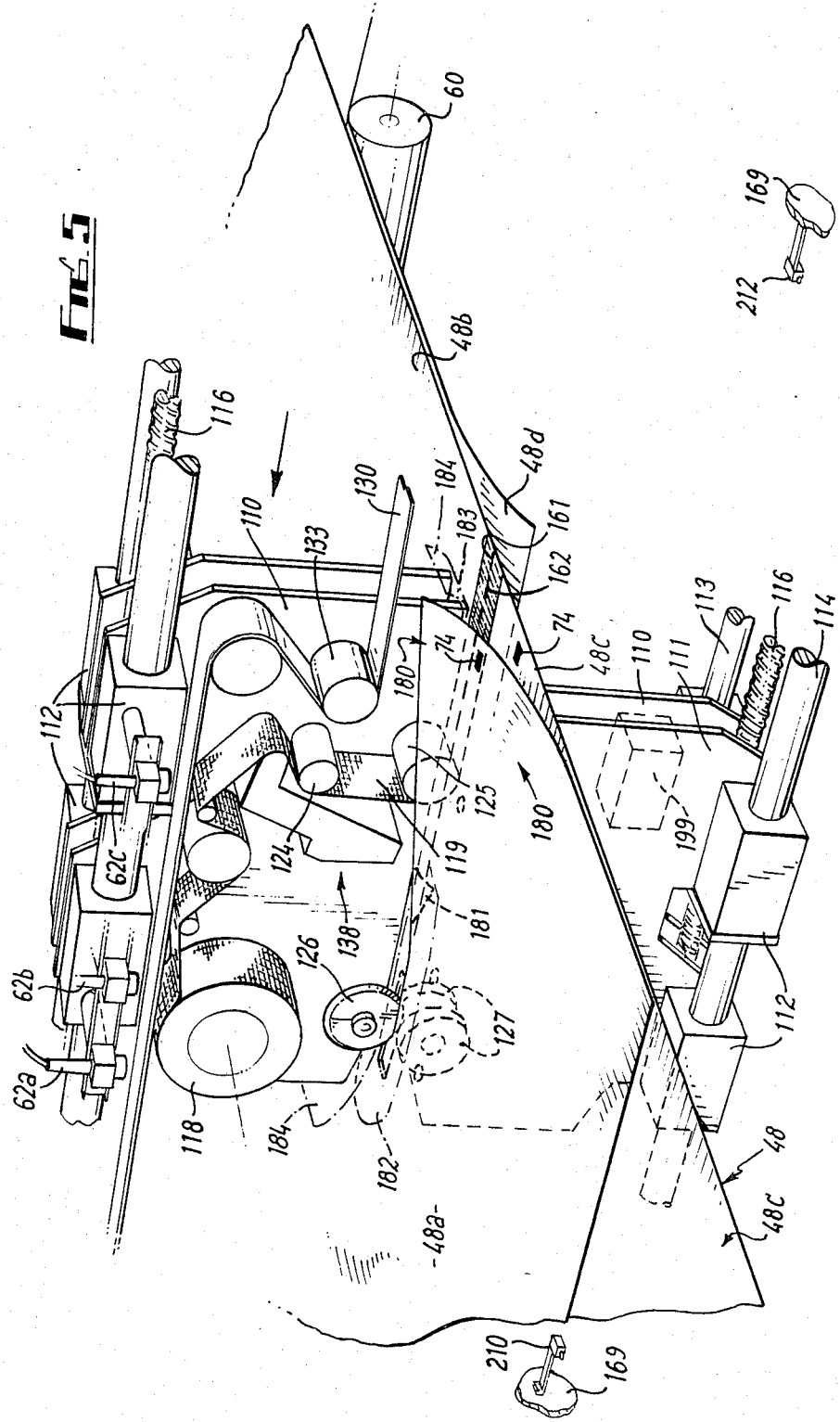

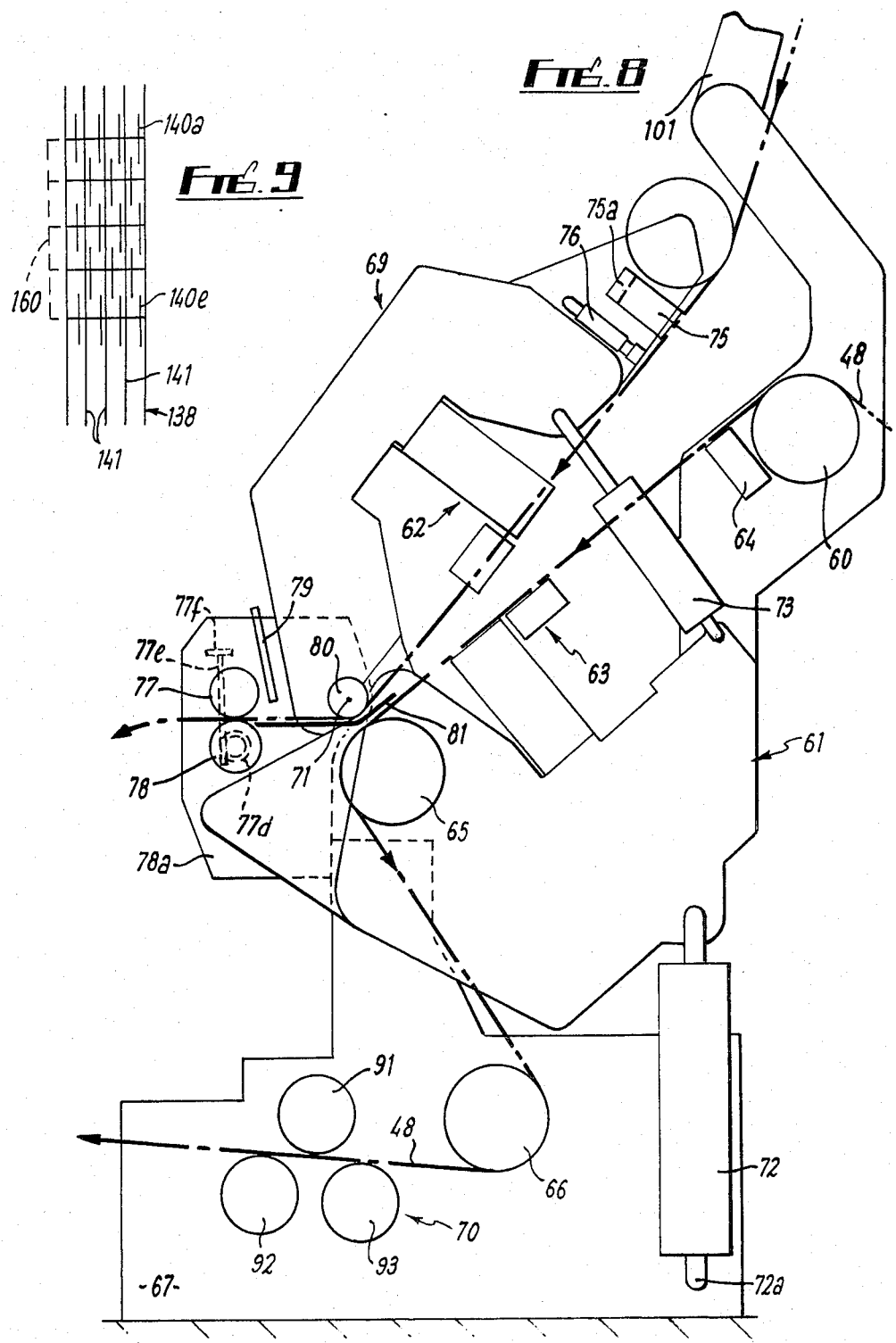

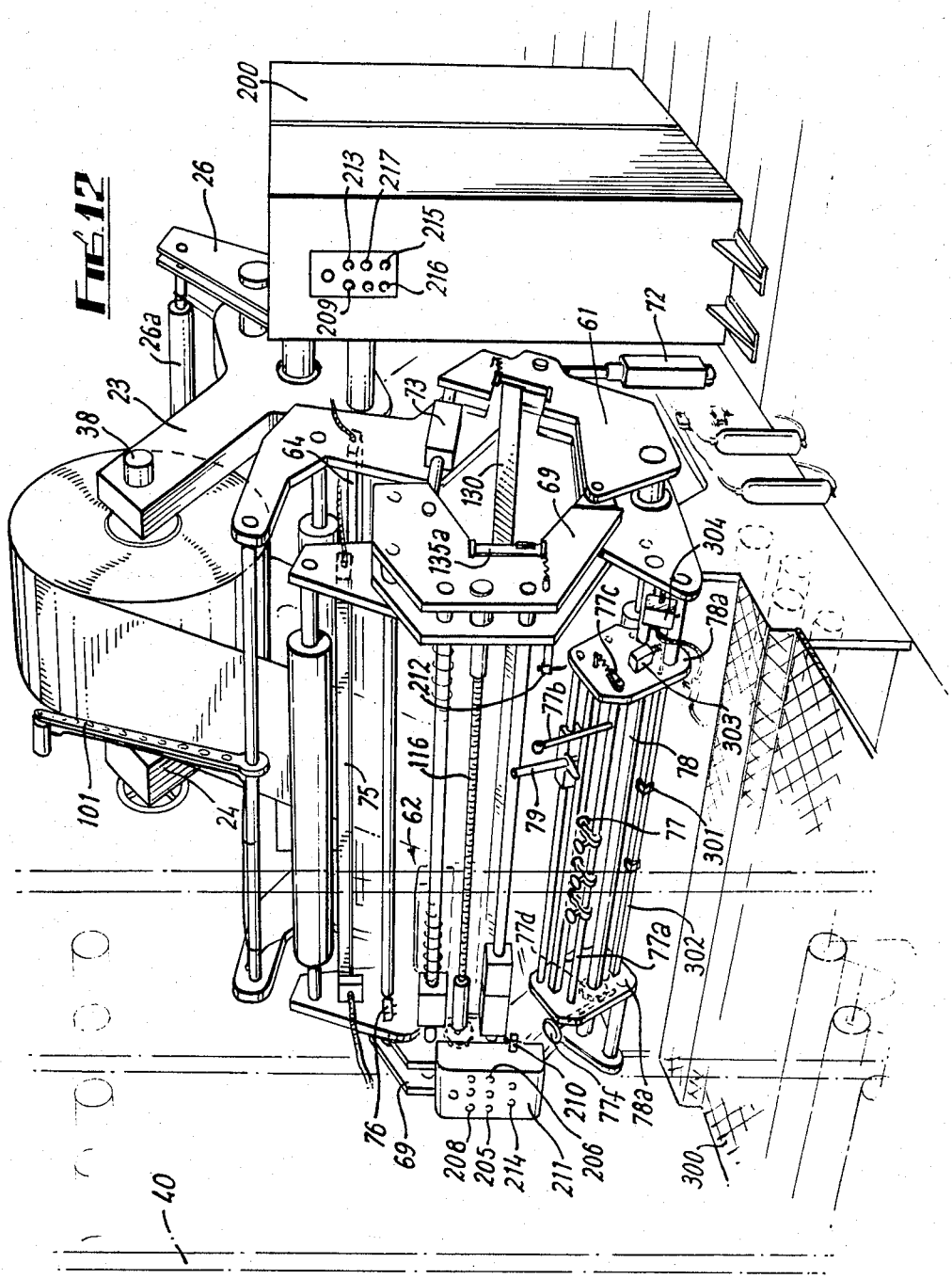

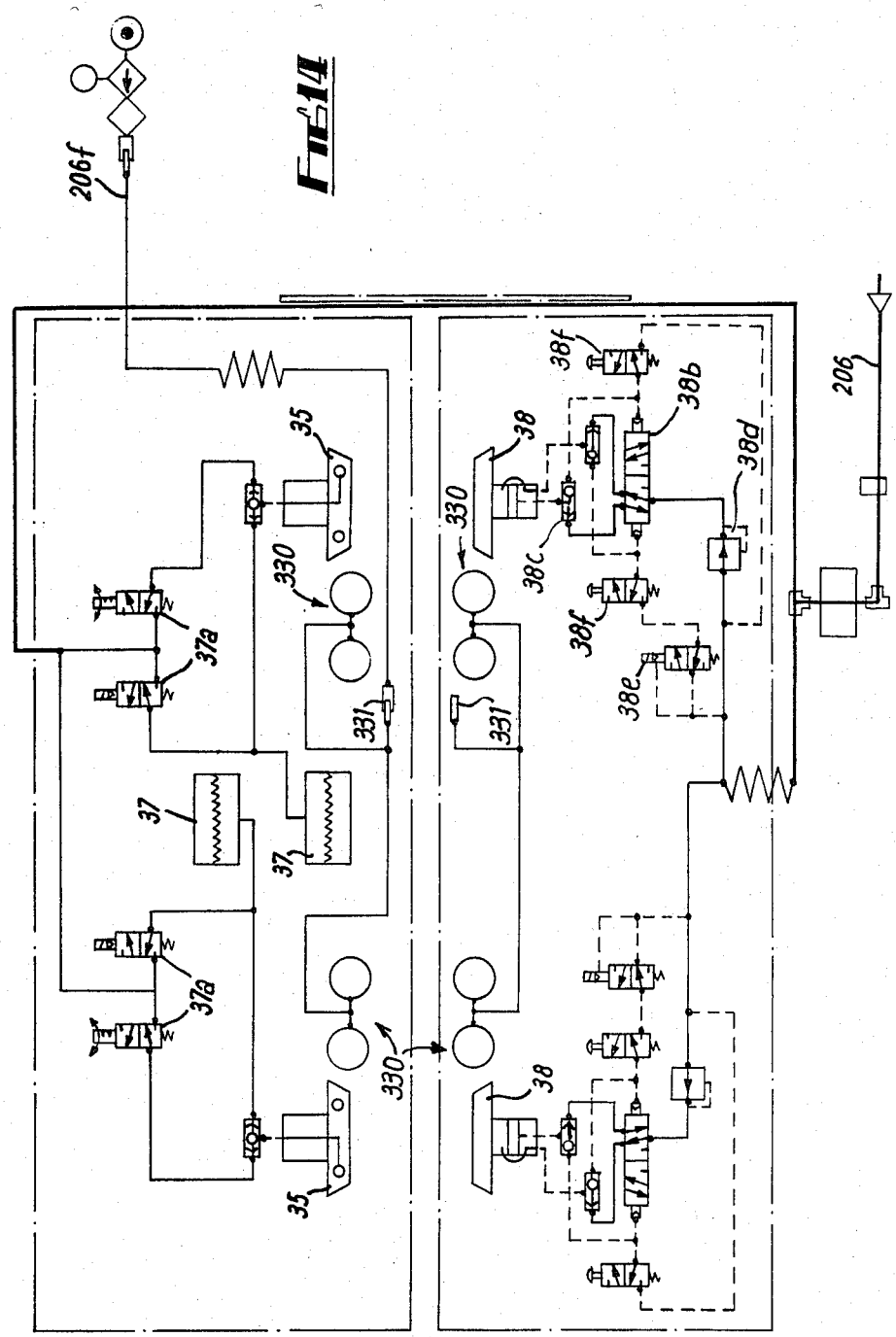

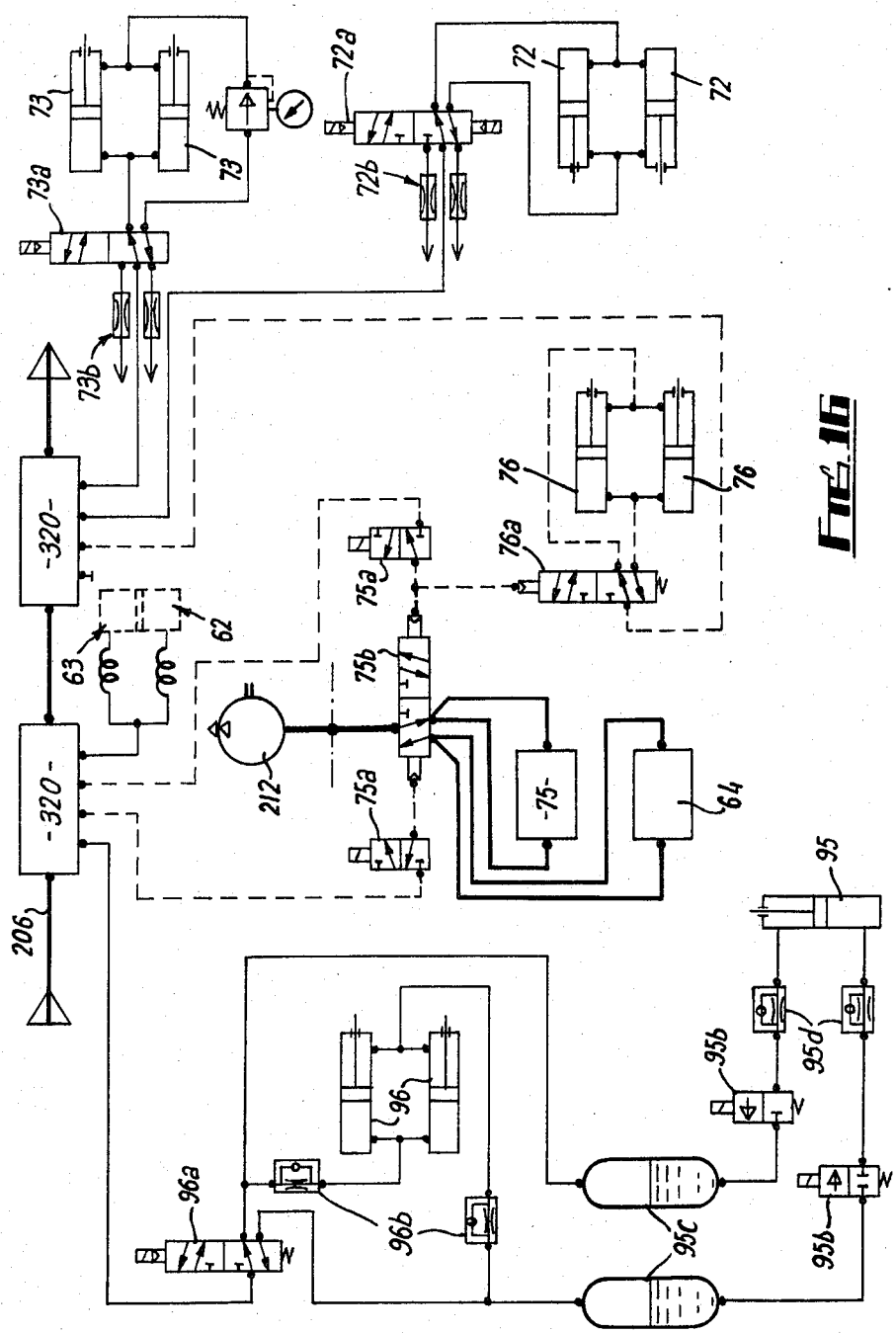

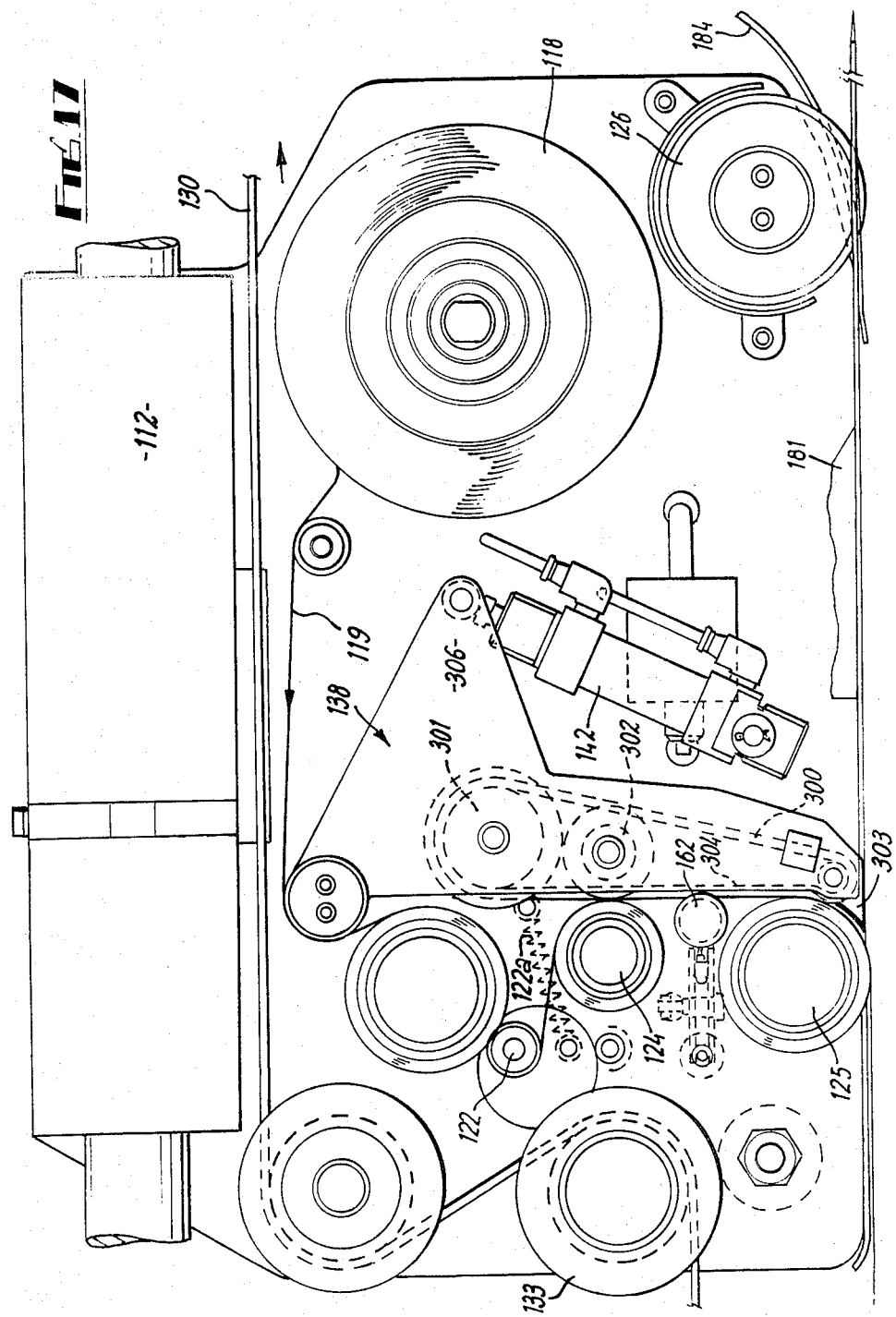

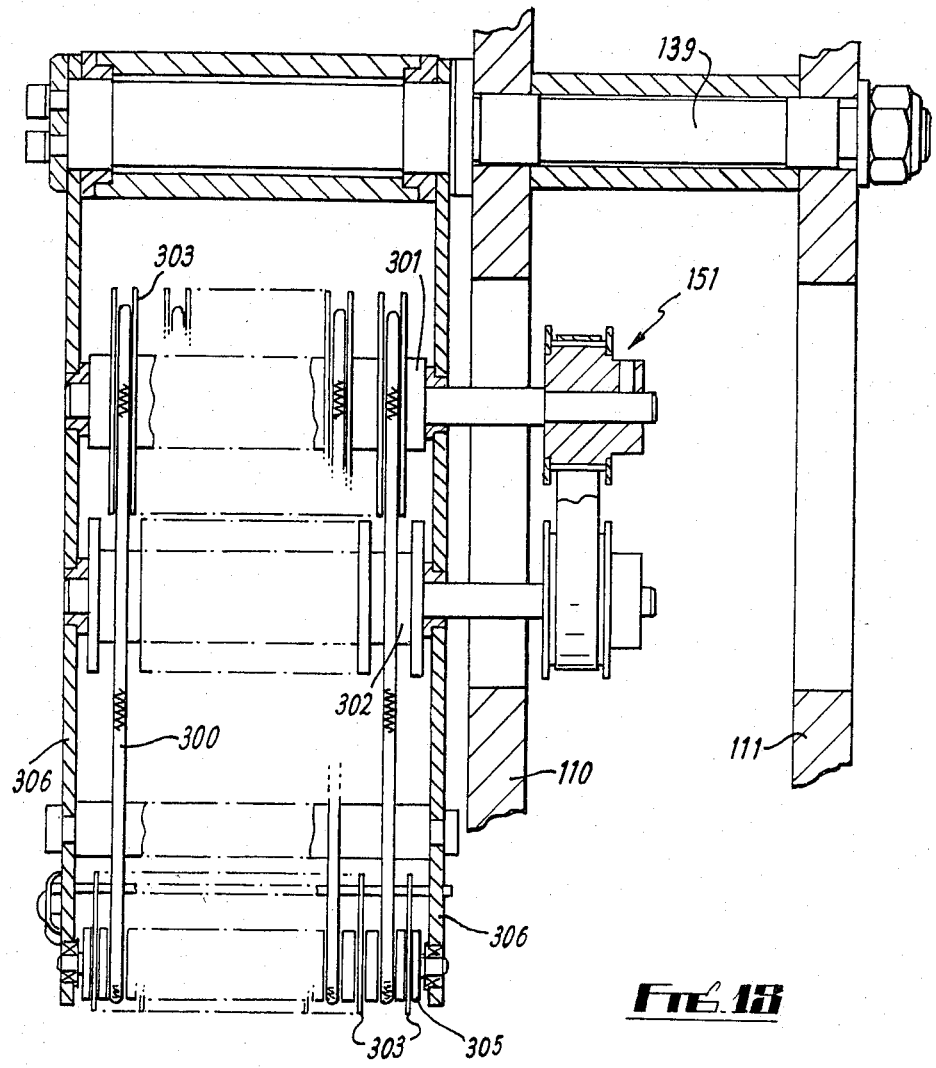

APPARATUS AND METHOD FOR JOINING WEBS

This invention relates to apparatus and methods for joining webs of flexible material, for example paper or plastics or laminates of paper and metal film or of plastics and metal film.

In one known method of joining webs of material, adhesive is applied to a marginal portion of one web which is then manually overlapped with a marginal portion of the other web and the webs pressed together. The web alignment and extent of overlap are poorly controlled, and the overlapped portion is often not acceptable for subsequent use.

In another method, which attempts to make a butt join between the trailing end of a first web and the leading end of a second web on a reel, the first web is stationary, the leading end is manually brought to overlap the trailing end portion of the first web, the first web is then cut with a straight cut basically along the leading edge of the second web, both webs are then moved forward by respective pairs of nip rollers beneath a rotating cylinder carrying a length of adhesive tape which is placed on the portions of the webs adjacent the cut to effect the join whilst the webs are moving. It will be understood that the leading edge of the second web may be deformed, thus giving an irregular edge and probably gaps between the opposed edges of the webs. Also it is difficult to keep the nip rollers moving at exactly equal speeds, thus producing separation between the web edges or possible overlap of the webs.

In another method, a leading portion of the second web is cut off by hand, adhesive tape is applied to the second web along the marginal portion adjacent the cut edge, some tape extending clear of the cut edge; the first web is cut by hand, the webs are then moved forward by nip rollers as above and a rotating cylinder presses the tape on the second web against the trailing marginal end portion of the first web whilst the webs are moving. It is difficult to get a satisfactory butt join due to the manual operation and web movement. Moreover the webs are cut separately.

According to one aspect of the present invention a method of joining two webs of flexible material comprises bringing the webs into overlapping relationship, cutting the overlapped webs to provide two portions of each web respectively on opposite sides of the cut, removing one of the overlapped portions of one of the webs from the region of the cut, and applying a length of adhesive material to marginal portions of the webs adjacent the cut to effect the join.

Because the webs are cut together, the cut edges correspond to each other and essentially abut.

Preferably the webs are stationary during the cutting, removing and applying.

Keeping the webs stationary avoids difficulties involved in keeping moving webs in a desired relative position.

The cutting, removing and applying are preferably effected simultaneously. This reduces the time involved in making the join compared with sequential operation.

In one form the invention provides a method of joining two webs of flexible material comprising bringing a web from a first reel and a leading portion of a web from a second reel into overlapping relationship, cutting the over-lapped webs, removing from the region of the cut either the cut-off portion of the leading portion of the second web or the trailing portion of the first web, and applying a length of adhesive material to marginal portions of the webs adjacent the cut on the side of the removed portion to effect a join.

A second length of adhesive material may be applied to marginal portions of the webs adjacent the cut on the opposite sides of the webs to said first-mentioned adhesive material.

According to another aspect of the present invention apparatus for joining two webs of flexible material comprises means for holding the webs in overlapping relationship, means for cutting the overlapped webs, and means for applying a length of adhesive material to marginal portions of the webs adjacent the cut.

The apparatus may include means for removing one of the webs from the region of the cut so as to expose the marginal portion of said one web.

The apparatus may comprise means for moving said cutting means and said applying means together across the webs so as to effect said cutting and applying simultaneously.

The apparatus may comprise a support on which the cutting means is mounted; a mounting for a reel of adhesive material; guide means for said material drawn from the reel; and means for driving the guide means to draw material from the reel. The drive means may comprise a flexible member, for example a belt or chain, extending round roller means on said support and a connection between said roller means and said guide means so that as the support is moved across the webs the roller means is rotated by the flexible member to drive the guide means.

The guide means may comprise endless means, for example roller means engageable with the adhesive material. The roller means may comprise a plurality of rollers for engaging the material at locations spaced along its length. Each roller may be in a plurality of laterally spaced parts, the parts of one roller being interdigitated with parts of the adjacent roller or rollers. The endless means may be in the form of helical springs.

The guide means may comprise a roller for forming a nip with the webs, said material passing into the nip, and blade means urging the material into the nip.

Means may be provided for severing the adhesive material. Said severing means may comprise a knife driven by compressed gas.

The apparatus may include means for sensing a web edge and for operating the severing means at a predetermined relative position of said webs and said cutting means.

The web cutting means may comprise a wheel arranged to be rotated by said roller means.

The apparatus may comprise sensing means for sensing when the two webs are in a predetermined relative position. Said sensing means may comprise photo-cell sensors.

The web holding means may comprise clamp means, and means for engaging the clamp means when the webs are in said predetermined relative position.

The clamp means may clamp the webs on both sides of the cutting means.

The apparatus may comprise means for moving a web forward at a first speed, means responsive to the sensing means for moving the web forward at a second, slower, speed, and means for stopping the web in response to the sensing means with the webs in said predetermined relative position.

Said means for moving the web forward at said first and second speeds may comprise nip rollers.

Said nip rollers may be operated by hydraulic means through a linkage to effect said second speed web movement.

The invention may be performed in various ways and one specific embodiment with possible modifications will now be described by way of example with reference to the accompanying drawings, in which:

FIG. 1 is a side view of splicing apparatus;

FIG. 2 is a side view of a splicing apparatus largely similar to FIG. 1;

FIG. 3 is a front view of splice heads of a splice assembly;

FIG. 4 is a side view of FIG. 3 with parts omitted;

FIG. 5 is a diagrammatic perspective view of part of FIG. 3 but showing the splice head arranged to cut in the opposite direction;

FIG. 8 is a schematic view of part of FIG. 2;

FIG. 9 is a diagrammatic view of a tape transfer arm;

FIG. 12 is a front perspective view of the apparatus;

FIG. 14 is a pneumatic circuit for a turret;

FIG. 16 is a pneumatic circuit for the splicing assembly;

FIG. 17 is a front view of a modified tape applying assembly;

FIG. 18 is a side view of part of FIG. 14 on a larger scale; and

FIG. 19 is a perspective view of a web-separating shoe and plough.

Figure 6:
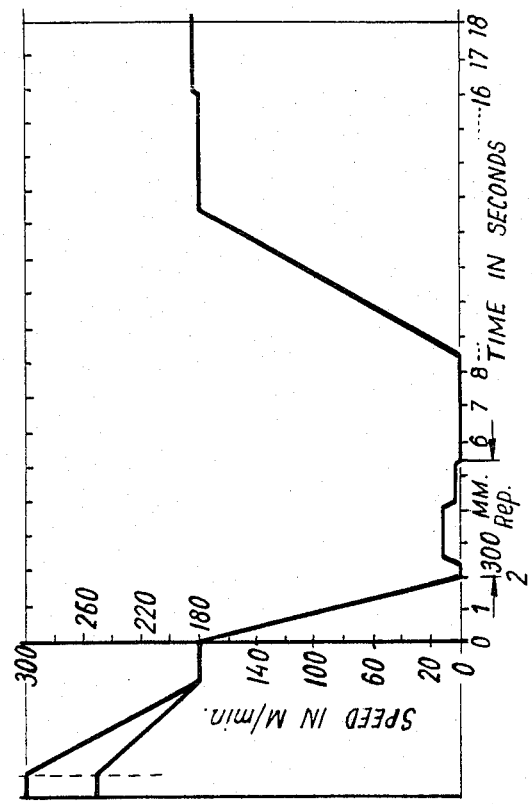
FIG. 6 shows a splice cycle.

The apparatus is for use in joining or splicing two webs or lengths of flexible material, for example paper or plastics, one example being fairly thick impregnated or coated paper used in making cartons for containing fruit juice. In the making of such cartons, a web of material is fed or unwound from a reel of the material and passes on a production line through a number of process stations in sequence at which stations, for example, the web is printed, creased on the lines of intended fold, and cut into blanks. The blanks are stacked and taken to a filling line in which they are folded on the creased lines into an open carton, filled with fruit juice, and then sealed.

One problem is that as a reel of the material begins to expire a new reel must be introduced into the line. As mentioned above, the joining of the web of the expiring reel to the web of the new reel may involve undesirable effects and require considerable attention by an operator.

In some cartons, a small area of weakness is provided in the top which can be pierced by a drinking straw. It is, therefore, important that the introduction of a new web, or a series of new webs, into the production line should not result in the displacement of the area of weakness into the side of the carton by an error or an incorrect or mis-register of the webs or by an accumulation of errors or mis-registers, produced by the joining of successive webs, which error is too large to be compensated for by any correction device which may be present downstream for example in the printing stage.

Referring now to the drawings, the apparatus includes a splicing or joining assembly 20 which is disposed between a turret 21 and a web accumulator in the form of a festoon 22. The turret 21 is generally conventional and has two parallel laterally spaced members 23, 24 carried on two transverse rods 25 connected at their ends by two plates 26, 27, one 27 of which is in two parts connected to gearing 28 driven by an electric motor 34 through belt 33 and gear 32. A further electric motor 29 is arranged to drive reel supports 35 in the ends of one member 24 through a coupling 30, gear 31, shaft 31a and gearing 31b in the interior of the member 24 and respective pneumatically operable clutches 37, the reel core ends respectively receiving an expandable drivable support 35 and a rotary support 38 in the respective end of the opposite arm 23. Solenoid operated control valves 37a are associated with the clutches 37 and supports 35. The operation of the turret motor, and the reel motor and clutches and brakes is controlled principally by the control unit, as described later. Screw means are provided for adjusting the lateral separation of the members 23, 24 to accommodate reels of different web width. Web guide rotary shafts 26a extend between the ends of the plates 23, 24.

The festoon 22 is generally conventional and has a sturdy main frame 40 supporting upper and lower series of transverse rollers 41, 42, the upper rollers 41 being mounted on a carriage 43 which is moved up and down by an electric motor 44 mounted on the carriage and driving a pinion 45 through a belt 46, the pinion engaging a vertical rack 47; a counterbalance weight is provided for the carriage. The web 48 enters the festoon round rollers 49 and 49a rotatable on fixed axes and then sequentially round the upper and lower rotatable rollers 41, 42 and then leaves the festoon over roller 49b and proceeds to the downstream processing or production stations. The festoon may be on the floor (FIG. 2) or partly in a pit (FIG. 1). The tension in the running web 48 is controlled by varying the speed of the reel drive motor 29. Some of the lower rollers 42 are mounted on a sub-frame 50 pivoted to the main frame 40 at 51 and connected to two pneumatic pistons 52 at respective sides of the frame 40 which apply a pre-determined, adjustable, force to the subframe 50 to urge the subframe 50 clockwise. If the tension in the web 48 changes, the sub-frame 50 tends to move (rotate) and this is sensed by a potentiometer 53 which signals the control unit to change the speed of the reel drive motor 29 to maintain the sub-frame 50 in the predetermined position and the web tension. If the web breaks, the sub-frame 50 rotates and engages a limit switch 54 to signal the control unit to stop the main apparatus turret and reel drive motors 29, 34.

In the running position, the festoon is full and carriage 43 is at the top of its movement. During splicing, the web is stationary and the carriage moves down to allow the festoon to empty and thus keep the downstream stations operating. After splicing, the carriage 43 rises to re-fill the festoon.

The splicing assembly 21 comprises jaws or structures 61, 69 which in the normal running position (FIG. 8) are up and open; each jaw carries a respective splicing head 63, 62. The structures 61, 69 comprise laterally spaced side members fixed to transverse bars.

In the splicing position of the reels (FIG. 2) web 48 from expiring reel 39 passes round rotatable shaft 60 mounted in structure 61 of the splicing assembly; between upper and lower splicing heads 62, 63; over a laterally extending lower vacuum clamp head 64 supported in structure 61; round rotatable shaft 65 mounted in structure 61; round rotatable shaft 66 mounted in a fixed structure 67; through a now-open register nip unit 70 and thence to roller 49 in the festoon.

The splicing head assembly 20 is pivoted to structure 67 at transverse axis 68 and comprises lower structure 61 and upper structure 69 pivoted to structure 61 at transverse axis 71. After splicing, laterally spaced pneumatic rams 72 connected between structures 67 and 61 are energized to move the splice assembly 20 away from the turret about pivot 68 to an up position, the web continuing to pass through the assembly as it runs off the new reel. With the apparatus, the webs may be simply spliced or both spliced and brought into register; in either case splicing may be initiated manually or automatically in response to the diameter or speed of the expiring reel.

During insertion of the new web through the splicing assembly, the web 48 is running as shown (FIG. 8). Pneumatic rams 73 pivotally extending between structures 61 and 69 have been energized to pivot structure 69 anti-clockwise (FIG. 8) and the splice heads 62, 63 are thus separated to allow the operator to manually "web-up" or introduce the leading end portion 48a of the new web 48b into the splicing position between the splicing heads 62, 63. In the present case, each web 48, 48b has spaced register marks 74 FIG. 5 either throughout its length or in its end portions. The operator grasps the leading end 48a of web 48b and draws it over but spaced from the running web 48, beneath laterally extending upper vacuum clamp head 75 in structure 69; beneath laterally extending pneumatic clamp 76 mounted in structure 69; between the splicing heads; between roller 80 and guard plate 81; and between unidirectional transverse nip rollers 77,78 until a mark 74 is beneath a register sight 79. Movement of rams 72, 73 is determined by the strokes of the ram pistons.

The roller 78 extends between plates 78a forming part of structure 69 (FIG. 12). A bar 77a carries spaced rollers 77 and can be moved using handle 77b between the closed position shown in which the web is clamped, and an up, open, position. This movement is associated with over-centre springs 77c. Bar 77a carries a gear 77d engaged by threaded element 77e rotatable by hand wheel 77f to enable the web to be moved forward between the nip to bring a mark 74 beneath the sight 79. The vacuum head 75 holds the web 48b spaced from the web 48.

If the webs have no register marks, the sight 79 is not used.

After a new reel has begun to unwind, the operator loads a fresh reel into the turret; this fresh reel being in the bottom position.

In one arrangement, the operator observes the running reel 39 and at an appropriate time at which movement of the turret will not foul the splicing assembly operates for example a button 209 forming part of the control unit to energize the turret motor 34 to bring the now-expiring reel to the bottom and carry the new reel 82 to the top. An inductive position sensor in the control unit senses the movement of the turret shaft 31b and on completion the rams 72 via solenoid operated control valve 72a are energized to lower the splice assembly with upper and lower structures 69, 61 held apart by rams 73 (FIG. 8). After the new web is inserted in the splicing assembly, the operator actuates a control button 208 in unit 211 FIG. 12 to operate one valve 75a controlling valve 75b to supply vacuum from pump 212 to clamp head 75 to hold the upper web. The operator then turns knob 207 to either "splice" or "register"; "splice" being when marks 74 are not used. The operator then actuates button 206 to inch the splicing heads forwards across the web (or button 205 to inch them backwards) as described later. The operator then actuates control 214 to operate the rams 73 via solenoid operated control valve 73a to close the splicing heads to the position shown (FIG. 2). The splicing assembly is then ready and splicing can then proceed as described later.

A sensor indicated diagrammatically at 83 senses the diameter of the expiring reel 39 and at a predetermined diameter sends a signal to the control unit to disengage the clutch 37 of the reel 39 being driven and to brake the reel so that the reel 39 slows and then stops. At the same time the festoon motor 44 is started and the festoon 22 thus then starts to empty, carriage 43 moving downwards, so that the downstream stations continue to operate at the same running speed and web tension, the potentiometer 53 now controlling the speed of motor 44. Webs 48, 48b are now stationary. Register nip rollers 91, 92, 93 of register nip unit 70 are mounted in structure 67. Rollers 92, 93 are connected to pivoted linkage 94 operated by hydraulic actuator 95. The roller 91 can be moved up and down in guides by laterally spaced pneumatic rams 96 alternatively to release and clamp the web 48. Electric motor 97 supported in structure 67 drives rollers 92, 93 through belt 98. The rollers 91, 92 93 are brought into clamping engagement with the web 48 with the web going first between rollers 91, 93 and then between rollers 91, 92. A time delay in the control unit is initiated when the reel motor ceases to be energized and after the delay the motor 97 is energized to move the web 48 forwards until a register mark 74 on web 48 comes beneath a first reflective photo-cell sensor 99 in structure 67 responsive to light reflected from the web. This immediately stops motor 97 and brakes 92a, 93a for rollers 92, 93 are engaged. Stopping of motor 97 energizes actuator 95 to move the linkage 94 and thus rotate still-braked rollers 92, 93 to move the web 48 slowly forwards by a small amount, say 30 mm, until the mark 74 on web 48 is beneath a second photo-cell sensor 100 which signals the control unit to lock the actuator 95 with the marks 74 on webs 48, 48a in predetermined positions and thus the webs in predetermined relative-positions or in register, for example within a tolerance of up to plus or minus 0.25 mm. The flow and return lines to the actuator 95 are connected to air/oil cylinders 95c which are pressurized by air. A solenoid valve 95b is in each line and when the second register sensor 100 is actuated these solenoid valves are de-energized to close the lines and positively lock the actuator 95 and thus the web 48 in the clamped position.

Operation of sensor 100 initiates clamp 76 through valve 76a so that the webs 48, 48b are then clamped together between the clamp 76 and head 64; web 48b is clamped between rollers 77, 78 and web 48 is clamped between rollers 91, 92 and between rollers 91, 93. When clamp 76 is energized, vacuum is removed from top bar 75 and applied to bottom bar 64, via change over valve 75b. Cutting and splicing of the webs may then take place as described later.

When splicing is finished, the clamp 76 is released and vacuum in clamp 64 released and the brakes on nip rollers 92, 93 are released and the actuator 95 moved back to start position to release the nip clamps; the new reel 82 is then accelerated up to normal running speed matched with the output speed of the web from the festoon and the festoon is re-filled. These movements are controlled by sensors, timing devices and the control unit. A spring-biassed pivoted tachometer arm 101 has been brought by downward movement of the splicing assembly into engagement with the surface of the now-running reel 82 and senses the speed of the web to control the reel drive motor 29 to stop acceleration of the web when the web is at the desired running speed and transfer tension control of the web back from the festoon motor to the reel drive motor, in association with potentiometer 53.

Instead of the hydraulic actuator 95, fine register adjustment could be by a ball screw assembly driven by an electric motor. It is possible for the coarse and fine register adjustment to be by a ball screw assembly and an electric motor operable at faster and slower speeds.

The sensor 83 could include means for sensing the speed of rotation of the unwinding reel, which rotational speed increases as the reel unwinds, correlated with a predetermined reel diameter so that the splice sequence is initiated at a predetermined reel speed indicative of a predetermined reel diameter.

FIGS. 3 to 5 show operation of the splicing heads. The upper and lower splice heads 62, 63 are generally similar so that adhesive splicing tape may be applied both above and below the webs (FIG. 3) or only on one side (FIG. 5). The tape mounting for only one head need, therefore, be described. Each head 62, 63 comprises parallel plates 110, 111 carrying spaced linear bearings 112 on shafts 113, 114 the plates being connected by boss 115 receiving ball bushing screw shaft 116.

One plate 110 carries a rotatable shaft 117 for receiving a reel 118 of adhesive tape 119 which passes over a rotatable guide shaft 120; round a rotatable tape drive roller 121 on plate 110; over floating nip roller 122; round rotatable guide shaft 123; over rotatable tape drive roller 124; and over tape lay-on roller 125. A slitter wheel 126 rotatably mounted on plate 110 engages between two parts 127 of a slitter anvil rotatably carried in the lower head 63. The slitter heads 62, 63 are traversed across the overlapping webs 48b, 48 simultaneously to cut the webs on a common line of cut and to lay the tape (or tapes) to splice the webs.

A splicing head drive belt 130 is anchored at one end 131 at one side of the structure 69 and extends between guide pulleys (not shown) respectively engaging the belt edges; over rotatable guide roller 133 on plate 110; round rotatable guide roller 134 on plate 110 to a belt tension device 135 at the other side of the structure 69 comprising a spring-biassed rotatable rod 135a round which the belt engages. A similar belt and belt drive are provided for the lower head. An electric drive motor 136 FIG. 2 mounted in structure 61 rotates the shafts 116 through chain belts and gears 137. This traverses the splice heads across the webs as shown by the arrow FIG. 5. The traverse speed may for example be up to 0.8 m per sec. The motor 136 is energized as described later.

A tape-transfer arm 138 is pivoted to plate 110 at 139 and comprises a series of rollers 140a to 140e each roller being split into several laterally spaced parts and between adjacent parts are located curved blades 141 (FIG. 9). The periphery of each roller provides an endless surface. The blade and anvil move slightly faster than the traversespeed. The parts of the adjacent rollers 140a to 140e are interdigitated with the parts of the rollers above and below and have knurled surfaces. The number of parts in each roller 140 can be varied to suit the width of the tape. The arm 138 can be moved from the inoperative position shown in FIG. 3 by a pneumatic piston/cylinder 142 to an operative position in which the rollers 140a to 140e and blades 141 engage the adhesive surface of the tape and urge the tape 119 against the lay-on roller 125. A knife 144 is arranged for cutting the tapes as described later. The blades 141 urge the tape 119 into the nip between the tape-applying roller 125 and the webs. The tape has adhesive on one side face 119a only, this face engaging rollers 140 to assist in urging the tape forwards. The arrangement of multiple rollers and blades serves to resist any tendency of the tape to wrap itself round the rollers 140.

During traversing, rotation of belt roller 133 drives the rollers 121 and 125 through belt 145 and gears 146, 147 and 148 and roller 125 drives slitter wheel 126 through belt 149 and gears 147 and 150. Top roller 140a is driven by the roller 134 through pulleys 151, 156 and belts 157, 158 via clutch 159, and roller 140a drives rollers 140b to 140e through gearing 160 or belt drives.

The rollers and gears are mounted on the outside of plate 111 and carried on shafts rotatable in plates 110, 111.

FIG. 5 shows the marks 74 in register. It will be observed that the leading portion 48a of web 48b is cut off by wheel 126 and the cut edges 161, 162 of webs 48, 48a are in abutting relationship with no overlap or gap, the tape 119 being laid equally on the two marginal portions adjacent edges 161, 162. The tape transfer arm 138 is brought to the operative position when traverse motor 136 is energized. The anvil 127 is rotated in a similar manner to the slitter wheel 126.

Figure 7:
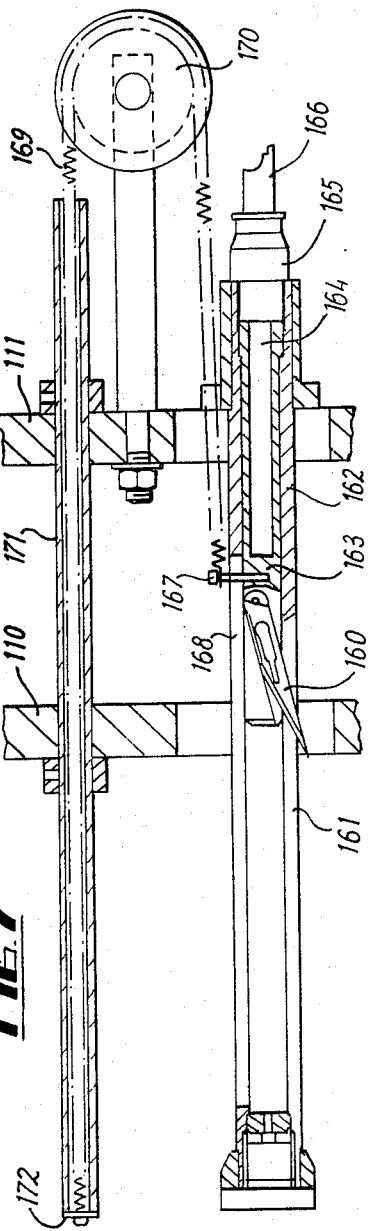
FIG. 7 is a section through tape cutting means.
Figure 10:
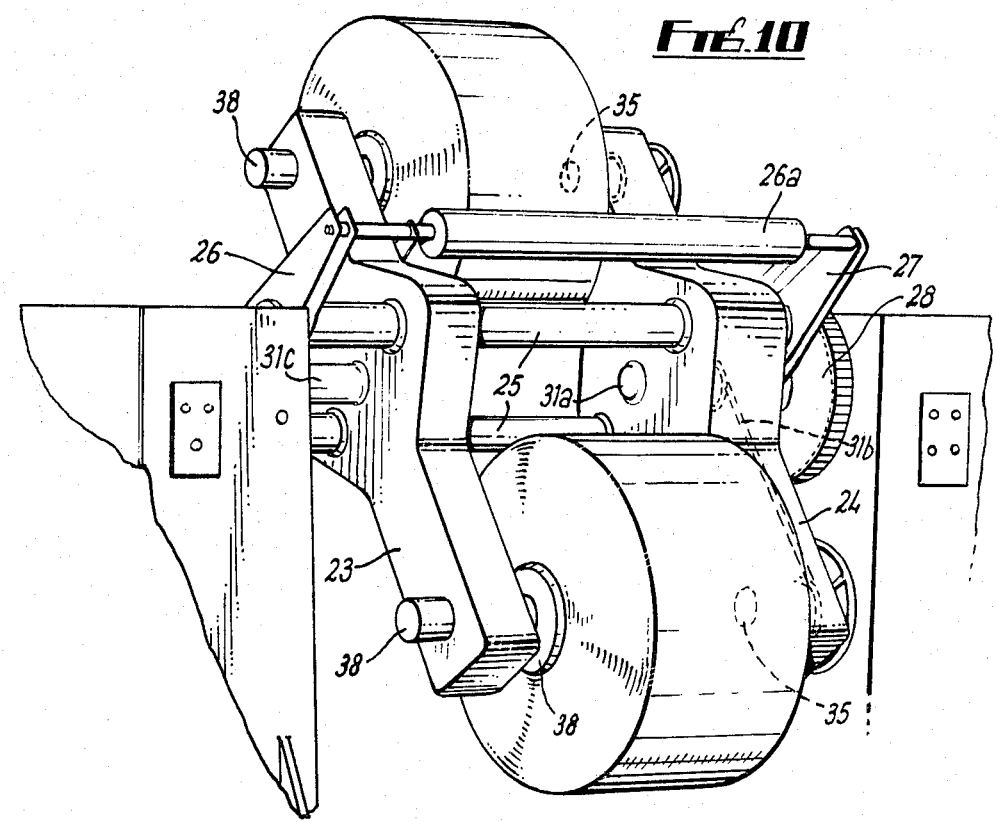
FIG. 10 is a perspective view of part of a turret.

Sensing means 62a carried by the splicing head senses the progress of the traverse and engages clutch 159 at an appropriate time so that the tape 119 begins to feed forwards off reel 118 and the leading edge of the tape 119 now fed forwards is laid at or close to the side edge 48c of the abutting webs. The sensing means 62a also operates valve 142a to energize ram 142 to bring the transfer arm 138 to the operative position. Sensing means 62c initiates cutting of the tape 119 at a predetermined position prior to completion of the traverse and also disengages clutch 159 to stop unwinding of tape from reel 118. A bullet knife 144 FIG. 7 is propelled across the tape 119 by compressed air from a suitable source, and the knife is spring-returned to its initial position. A suitable knife 144 is shown in FIG. 7 and includes a scalpel blade 160 extending through a slot 161 in tubular housing 162 and pivoted at its inner end to slide 163 slidable in the housing. The slide 163 includes closed bore 164 connected to coupling 165 for receipt of a pulse of compressed air through pipe 166. A pin 167 extends through opposed slot 168 and is fixed to slide 163. Sensing means 62b operates ram 142 to move arm 138 away from the tape. A spring 169 extends from pin 167 round wheel 170 and through tubular guide 171 to an end fixing 172. As the blade 160 moves along the slot 161 to cut the tape 119 when a pulse of air is delivered to bore 164 the spring 169 is extended and tensioned and the spring 169 retracts the blade 160 to the start position after the tape 119 has been cut. The traverse sensing means 62a, 62b, 62c may comprise photoelectric cells 173 FIG. 4 with reflective discs 174, mounted on the splicing head and sensing the side edges 48c of the webs.

As the splicing heads are being traversed, the leading edge portion 48a of the web 48b from the new reel is bent or curved outwards as at 180 by a plough element 181 extending upwards from a flat blade 182 which is between the webs 48, 48a and on completion of splicing the cut-off leading edge portion 48a of the new web 48b falls away or is manually removed. The plough element 181 is inclined forwards as it extends away from the slitter wheel 126 and is of a height to carry web portion 48a outwardly clear of the arm 138. The web from the expiring reel is located between the blade 182 and a support sheet 183, which has an inlet portion 184 inclined away from the webs. The sheet 183 serves to resist wobble of the webs in the region of the cut and is of a length to extend up to the slitter wheel.

The length of tape cut corresponds to the width of the webs and when applied to the webs does not extend laterally beyond the web sides.

On joining, an effective butt join is formed with substantially no gap between or overlap of the web edges 161, 162.

FIG. 6 shows a typical cycle of time with respect to reel speed. The downstream stations run normally at say 180 m/min. The unwinding reel starts to stop and the festoon starts to empty. The reel stops in 2 seconds. After about ½ second the reel is accelerated to about 10 m/min during coarse positioning of the register mark of the expiring reel and this is reduced to about 1 m/min during fine positioning. When the mark 74 has been brought to the desired position (say about 5 secs.) the reel is stationary and the webs are clamped. After cutting and joining of the webs say at about 8 secs. the new reel is accelerated up to running speed of 180 m/min and after some 3 seconds this is increased to about 182 m/min to allow the festoon to re-fill. When the festoon is full, the speed returns to 180 m/min, under control of the web tension responsive means. The storage length in the festoon may for example be 30 meters and the time for a splicing cycle about 13 seconds. The splicing head traverse speed may be 100 m/min. The distance between successive register marks may vary with different applications, for example 5 cm or 30 cm or 68 cm. The adhesive tape may be that sold under the name sellotape, for example 7.5 cm wide. Adhesive coated paper could form the tape.

Figure 13:
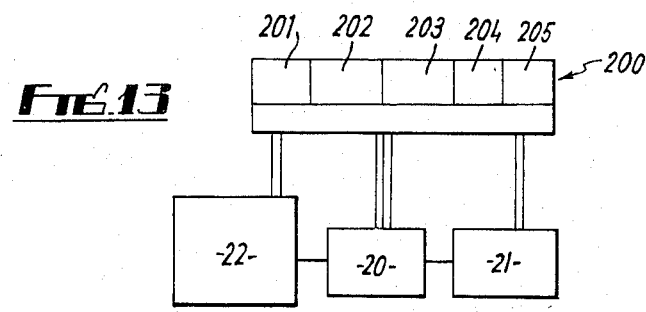
FIG. 13 is a schematic illustration of a control unit.
Figure 11:
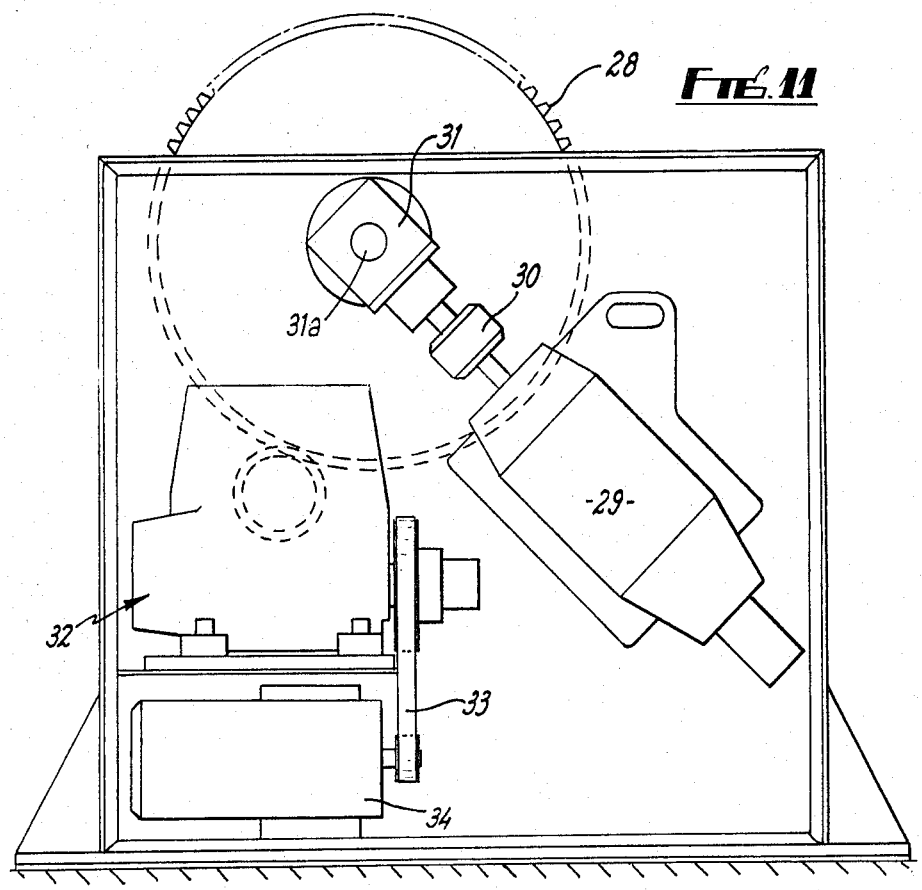
FIG. 11 is a side view of turret drive mechanism.
Figure 13:
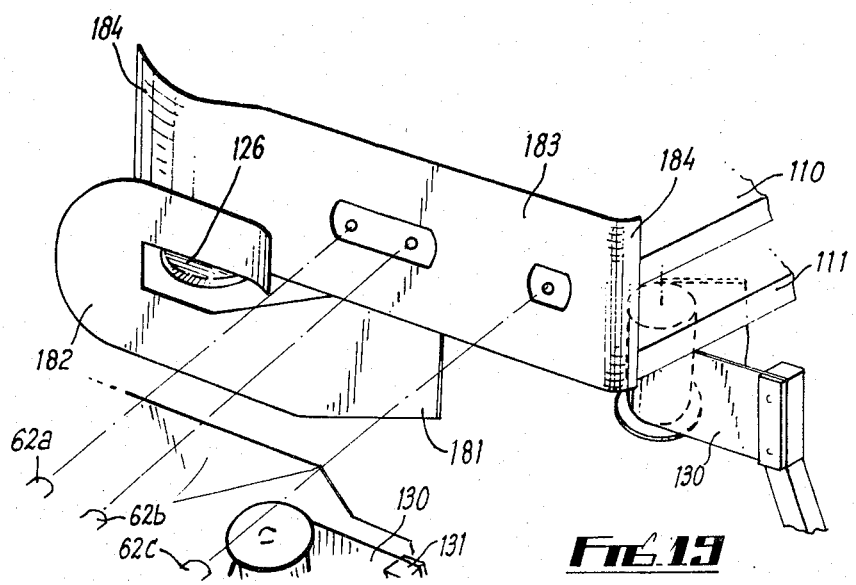

Referring to FIG. 13, a diagrammatic control unit 200 is shown linked to the festoon 22, splicing assembly 20 and turret 21 by electric connections for effecting the cutting and joining in timed sequence as described above. The control unit contains timing means 201, electric switches 202, relays 203, programmable logic circuits 204 and a micro-processor 205. The pressurized air may come from a factory pressure line 206 or from a pump. The construction and operation of the control unit may take various forms and need not be described in full detail. The control unit and manual controls are arranged to enable and effect a cycle of operations as follows.

At the start of a splicing cycle with a reel in the top turret position unwinding and a new reel loaded into the turret at the bottom position, the operator actuates a control button 209 in the control unit 200 which energizes the turret motor 34. A position sensor 20b in the control unit responds to rotation of the turret to stop the turret motor 34 when the unwinding reel is at the bottom position. In response to the position sensor, the control unit operates solenoid valve 72a controlling supply of pressure air to rams 72 to lower the splicing head assembly 20, the splicing heads being held apart by rams 73. Knob 207 is in the "register" position. The operator then stands on platform 300 and brings the leading portion 48a of the new web 48b to the register position using sight 79 and then operates a clamp control button 208 in a subsidiary control unit 211 FIG. 12 to connect the vacuum pump 212 through valve 75b to activate the top vacuum clamp 75 to hold the upper web. The operator then actuates inch control button 205 or 206 to traverse the splicing heads to a position in which blade 182 is just overlapping the side edge 48c of the upper web 48b.

The operator then actuates a splice assembly close button 214 in the unit 211 which sends an electric signal to operate solenoid valve 73a to operate rams 73 to close the jaw structures 61, 69 to the splicing position.

During automatic splicing, when the sensor 83, which may take the form of a counter responsive to the rotation of the reel drive motor 34, senses the expiring reel has reached a predetermined diameter, it signals the control unit 200 which de-energizes the reel motor 34, applies the reel brake and dis-engages the reel drive clutch 37. Simultaneously the control unit energizes the festoon motor 44 to lower the carriage 43, the potentiometer 53 now controlling the speed of festoon motor 44 to maintain the tension in the web. After a predetermined time set by a timer in the control unit, by which time the reel has stopped, the control unit 200 energizes nip register motor 97 and solenoid valve 96a to supply pressure air to energize rams 96, to lower roller 91 into web clamping relationship with rollers 92, 93 and drive the expiring web forwards until the first register photocell 99 senses a mark 74 and signals the control unit which stops nip motor 97, and energizes brake solenoids to apply brakes 92a, 93a. Solenoid valves 95b are energized to operate hydraulic actuator 95 to move the web forwards until photo-cell 100 senses the register mark and signals the control unit which operates valve 95b to lock the actuator. The control unit also energizes a solenoid valve 76a to supply pressure to pneumatic clamp 76, the vacuum on clamp head 75 now being released and applied to clamp head 64.

Simultaneously the control unit energizes splicing traverse motor 136 and energizes a solenoid valve 142a to supply pressure air to ram 142 to lower the traverse arm 138 to the operative position. A first traverse photocell 62a senses the initial web edge 48c and sends an electric signal to a separate traverse-control unit 199 which engages clutch 159 to start the tape 119 forwards at such a time that the leading edge of the tape is laid at the web edges. A second traverse photocell 62c senses the initial web edge 48c and signals the control unit 199, which operates solenoid valve 142a to move the transfer arm 138 up to its inoperative position, and disengages clutch 159. The tape is now fed forwards by the roller or rollers 125. The traverse photocell 62b then senses the remote web edge and signals the traverse control unit 199 to operate solenoid valve 144a controlling supply of pressure air to the knife 144 to operate the knife to cut the tape at a location such that the end of the laid-on tape is at the opposite web edges. A limit switch 210 engages the splice head to sense the completion of the cutting traverse movement and signals the main control unit 200 which operates valve 96a to release the nip, and valves 76a and 75b to release the clamps 64 and 76 and engages the clutch 37 of the new reel and energizes the reel motor 29 to begin running of the new reel. When the new reel has reached running speed as sensed by arm 101 the tension control is switched from the festoon motor 44 back to the reel motor. When the reel is up to running speed, the operator actuates the control button 217 to energize rams 72 to raise the whole splicing assembly. During this upward movement the control unit actuates valve 73a to operate rams 73 to open the jaws 61, 69. After completion of the raising of the splicing assembly the control unit 200 energizes traverse motor 136 to traverse the splicing heads back to their start position to operate limit switch 212 to stop motor 136. Instead of register marks 74, punched holes can be used to bring the webs into register.

The tape 119 can be arranged to extend beyond one side of the webs to act as a flag to indicate the presence of a join.

In some cases the joining material 119 may be too thick to be cut easily by knife 144, for example woven material, in which case a pre-cut length of joining material is carried on a cylinder which replaces reel 118 and is threaded up by the operator prior to traversing.

It will be understood that with the described apparatus the join is between two newly-cut edges 161, 162, the webs being clamped and stationary during cutting and application of the tape so that there is little or no likelihood of the edges wobbling or becoming displaced.

If the web edges 161, 162 have not already moved into abutting relationship, passage between rollers 125 achieves this.

Preferably the slitter wheel 126 starts cutting the webs at one side a little before the clutch 159 is engaged to move the tape 119 forwards, and the slitter wheel 126 leaves the webs at the other side and ceases cutting the webs a little before the tape 119 is fully applied to the webs, but the greater part of the tape is applied to the webs whilst they are being cut. Web cutting and joining occur on the same traverse of the splicing heads.

It will be understood that after cutting each web 48, 48b has two portions 48a, 48b and 48c, 48d respectively on opposite sides of the cut. One of the portions 48a is removed by the plough to allow the tape 119 to be applied to the abutting margins of portions 48c, 48b and another of the portions 48d is removed by gravity to allow tape 119 (if used) to be applied on the opposite side of the webs to the abutting margins of portions 48c, 48b. Portion 48a is removed by the plough but it could be removed by hand; portion 48d is removed from the region of the cut by gravity.

Figure 15:
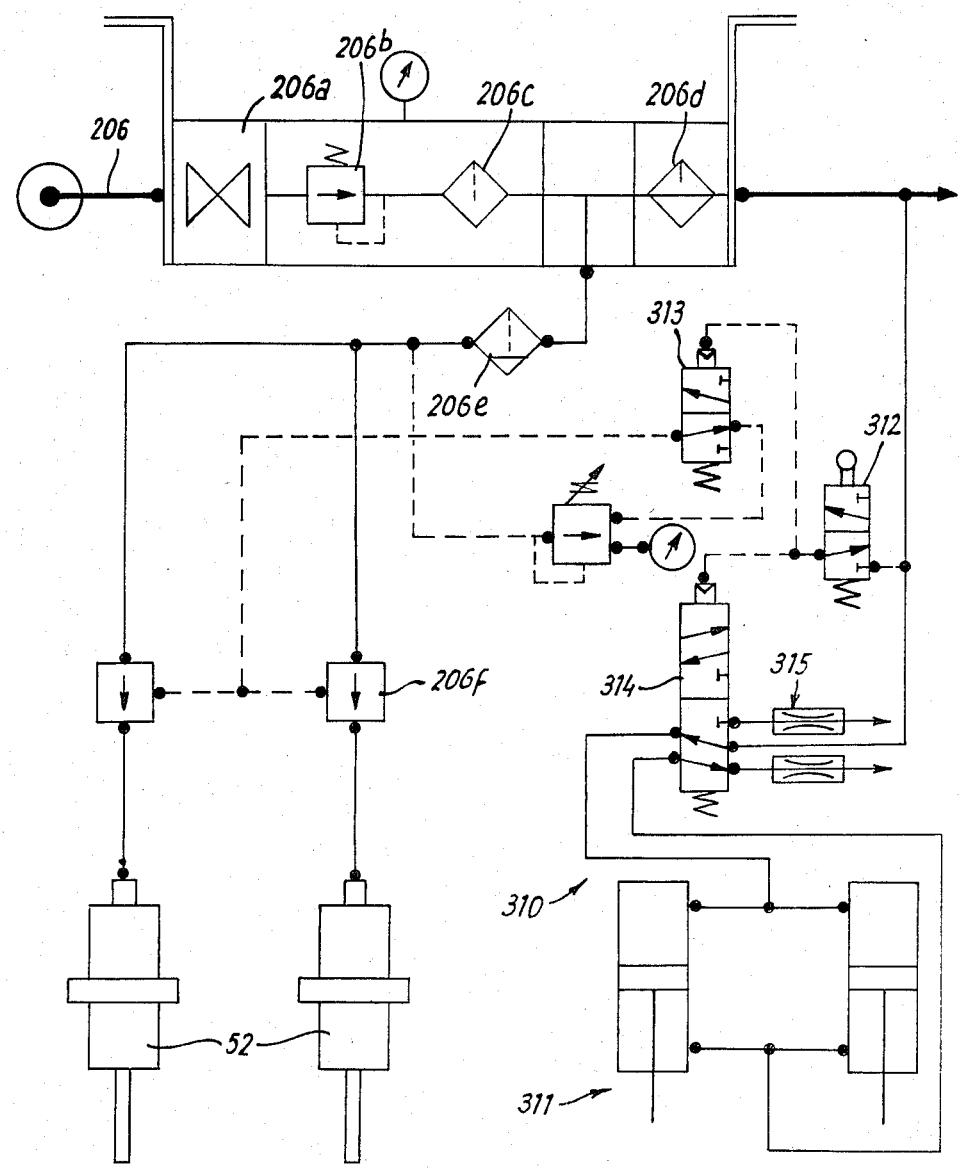
FIG. 15 is a pneumatic circuit for a festoon.

In a preferred modification shown in FIGS. 14, 15 the rollers 140 of the transfer arm 138 are replaced by endless helical tension springs 300, six as shown, driven by rollers 301, 302 mounted in structure 306. The springs are interdigitated with flat blades 303 similar to blades 141 but in this case there are separate blades associated with the two rollers. A guide roller 305 is rotatable in structure 306 of the arm 138 and guides the springs. Roller 122 is biassed by spring 122a. The length 304 of the springs opposite the knife 144 is effectively straight and supports the tape along this length. As the springs move round roller 302 they tend to open slightly thus assisting in separating the springs from the tape and resisting any tendency of the springs to adhere undesirably to the tape and carry the tape round the roller 302. The springs 300 provide a degree of flexibility in the tape support. The clutch 159 is omitted.

FIGS. 14 to 16 show one form of pneumatic circuit for the apparatus using standard components but it will be understood that other forms of circuit can be used. Parts of FIGS. 14 to 16 relate to features of the apparatus not directly related to the invention and are not described in detail. The valves are spool valves with port connections as shown and solenoid operated, mechanically operated or push button operated as conventionally illustrated. Supply 206f FIG. 14 feeds selectively through couplings 331 air cushions 330 used in lateral positioning of the turret arms 23, 24. Push button valves 38a control lateral movement of reel supports 38 through valve 38b and shuttle valves 38c, with pressure regulator 38d and solenoid valve 38e operable to prevent lateral movement of the supports 38 when the reel is running.

In FIG. 15 the supply 206 is through a manually operated on/off valve 206a, pressure regulator 206b, filters 206c, lubricator 206d, and pilot operated pressure regulators 206e. Circuit 310 including valves 311 is energized through valve 314 and valve 312 operated by a cam on the carriage 43 which can be moved during initial "webbing up" under the control of a push button; rams 52 are de-energized through air-operated valve 313. The speed of the carriage is controlled by exhaust restrictors 315.

In FIG. 16 the supply 206 is through manifolds 320 and the speeds of rams 73, 72, 95 and 96 is controlled by flow restrictors 73b, 72b, 95d and 96b respectively.

In some cases the webs do not need to be brought to a predetermined relative position before splicing, in which case the sight 79, nip 70 and associated register parts are not used. The control unit 211 has a control element 207 which can be moved to a register position or a non-register position as required as mentioned above. The splicing can be initiated manually or automatically by the control unit. A further control element 216 can be selectively positioned either "manual" or "automatic". In the former case, the traverse of the splicing heads and splicing of the webs is initiated by operation of control button 215 by the operator; in the latter case, the traverse is initiated by the control unit as described above when the expiring reel has reached a sensed condition.

With different webs used in a particular production line, the register marks 74 may be at different lateral positions. To accommodate this the sensors 99, 100 may be mounted on one of two web guides 301 FIG. 12 on a bar 302 which can be traversed as required by motor 303 and gearing under the manual control uf unit 304.

I claim:

1. A method of joining two webs of flexible material comprising bringing the webs into overlapping relationship, cutting the overlapped webs to provide two portions of each web respectively on opposite sides of the cut, removing one of the overlapped portions of one of the webs from the region of the cut so as to leave cut edges of the webs in abutting engagement across the width of the webs, and applying a length of adhesive material to marginal portions of the webs adjacent the cut to effect the join, the webs being held stationary during the cutting, removing and applying steps, said applying step comprising moving a store of said adhesive material across the webs, sensing a web side edge, applying said adhesive material in response to sensing of said web edge, sensing the other web side edge, and cutting the adhesive material in response to sensing of said other web edge.

2. A method as claimed in claim 1, in which cutting, removing and applying are effected simultaneously.

3. A method as claimed in claim 1, in which a second length of adhesive material is applied to marginal portions of the webs adjacent the cut on the opposite sides of the webs to said first-mentioned adhesive material.

4. Apparatus for joining two webs of flexible material comprising means for holding the webs in stationary overlapping relationship, means for cutting the overlapped webs so as to place a cut edge of one web in abutting engagement with a cut edge of the other web across the width of the webs, means for removing one of the webs from the region of the cut so as to expose the marginal portion of said one web, and means for applying a length of adhesive material to marginal portions of the webs adjacent the cut, the apparatus further comprising means for moving the web cutting means and the applying means across the webs, the applying means including means for severing the adhesive material, means for sensing a web side edge and for operating the severing means at a predetermined relative transverse position of said webs and said cutting means.

5. Apparatus as claimed in claim 1, including means for moving said cutting means and said applying means together across the webs so as to effect cutting and applying simultaneously.

6. Apparatus as claimed in claim 4, in which the severing means comprises a knife driven by compressed gas.

7. Apparatus as claimed in claim 4, including a support on which the cutting means is mounted; a mounting for a reel of adhesive material; guide means for said adhesive material drawn from the reel; and means for driving the guide means to draw adhesive material from the reel.

8. Apparatus as claimed in claim 7, in which the drive means comprises a flexible member extending round roller means on said support and a connection between said roller means and said guide means so that as the support is moved across the webs the roller means are rotated by the flexible member to drive the guide means.

9. Apparatus as claimed in claim 1, in which the guide means comprises endless means engageable with the adhesive material.

10. Apparatus as claimed in claim 9, in which the endless means comprises helical springs.

11. Apparatus as claimed in claim 8, in which the guide means comprises a roller for forming a nip with the webs, said material passing into the nip, and blade means for urging the material into the nip.

12. Apparatus as claimed in claim 18, in which the web cutting means comprises a wheel arranged to be rotated by said roller means.

13. Apparatus as claimed in claim 4, comprising sensing means for sensing when the two webs are in a predetermined relative position.

14. Apparatus as claimed in claim 13, in which the web holding means comprises clamp means, and means for engaging the clamp means when the webs are in said relative position.

15. Apparatus as claimed in claim 14, in which the clamp means is arranged to clamp the webs on both sides of the cutting means.

16. Apparatus as claimed in claim 13, including means for moving a web forward at a first speed, means responsive to the sensing means for moving the web forward at a second, slower, speed, and means for stopping the web in response to the sensing means with the webs in said predetermined relative position.

17. Apparatus as claimed in claim 16, in which the means for moving the web forward at said first and second speeds comprises nip rollers.

* * * * *